United States Patent
Shirakawa

(10) Patent No.: US 7,143,740 B2
(45) Date of Patent: Dec. 5, 2006

(54) ENGINE FUEL INJECTION CONTROL DEVICE

(75) Inventor: Takashi Shirakawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 29 days.

(21) Appl. No.: 11/035,099

(22) Filed: Jan. 14, 2005

(65) Prior Publication Data
US 2005/0188947 A1 Sep. 1, 2005

(30) Foreign Application Priority Data
Feb. 27, 2004 (JP) ............................. 2004-054514

(51) Int. Cl.
*F02B 3/00* (2006.01)
*F02D 41/40* (2006.01)

(52) U.S. Cl. ...................... 123/299; 123/305; 123/456; 123/435

(58) Field of Classification Search ................ 123/299, 123/300, 305, 436, 445–447, 457
See application file for complete search history.

(56) References Cited

U.S. PATENT DOCUMENTS

| 6,349,702 | B1 | 2/2002 | Nishiyama |
| 6,718,946 | B1* | 4/2004 | Hokazono et al. .......... 123/445 |
| 6,752,126 | B1* | 6/2004 | Pfaeffle et al. ............... 123/436 |

FOREIGN PATENT DOCUMENTS

| EP | 1568875 | * | 8/2005 |
| JP | 2001-82223 A | | 3/2001 |
| JP | 2001-227388 | * | 8/2001 |

* cited by examiner

*Primary Examiner*—Hai Huynh
(74) *Attorney, Agent, or Firm*—Global IP Counselors, LLP

(57) ABSTRACT

A fuel injection control device is configured to suppress the effect of pressure pulsation occurring inside the accumulator section of an engine due to a first fuel injection and thereby accurately control the fuel injection quantity in an engine configured to execute a plurality of fuel injections per cycle. When the fuel injection quantity for a second injection executed after a first injection is set, the fuel injection interval is detected and the fuel injection quantity is revised based on the fuel injection interval. The amount of time from the end of the first injection (e.g., a pilot injection) to the start of the second injection (e.g., a main injection) is used as the fuel injection interval.

15 Claims, 8 Drawing Sheets

ENGINE FUEL INJECTION CONTROL DEVICE

CROSS-REFERENCE TO RELATED APPLICATIONS

This application claims priority to Japanese Patent Application No. 2004-054514. The entire disclosure of Japanese Patent Application No. 2004-054514 is hereby incorporated herein by reference.

BACKGROUND OF THE INVENTION

1. Field of the Invention

The present invention relates to a fuel injection control device for an engine. More particularly, the present invention relates to a fuel injection control device for an engine having a pressure accumulator section provided in a fuel supply passage and a fuel injector connected to the pressure accumulator section, the engine being configured to execute a plurality of fuel injections per cycle.

2. Background Information

There are known engine fuel supply systems that employ a common rail as a pressure accumulator section in the fuel supply passage and supply fuel to the fuel injectors installed on the cylinders from the accumulator section. A known method of controlling the fuel injection of such a common rail type fuel supply system is to precede a main fuel injection that serves to develop the output power of the engine with a pilot fuel injection that serves to suppress the generation of nitrogen oxides (NOx). When such a control method is used, the total injection quantity delivered by the two fuel injections is generally adjusted in accordance with the pressure that exists inside the accumulator section before the pilot injection is executed. The pilot injection is a small-quantity injection executed during the compression stroke before the main injection and serves to suppress the generation of NOx by reducing the ratio of premixed combustion.

A related technology for accurately controlling the fuel injection quantity in a common rail type fuel supply system is disclosed in Japanese Laid-Open Patent Publication No. 2001-082223 (paragraph 0022). The technology of this publication is configured to detect the pressure inside the accumulator section before and after the fuel is injected, and then calculates the actual fuel injection quantity based on the difference between the detected pressures. It then compares the calculated fuel injection quantity to a target fuel injection quantity determined based on the operating state of the engine and adjusts the injector operation command value accordingly.

In view of the above, it will be apparent to those skilled in the art from this disclosure that there exists a need for an improved fuel injection control device. This invention addresses this need in the art as well as other needs, which will become apparent to those skilled in the art from this disclosure.

SUMMARY OF THE INVENTION

It has been discovered that there is a problem with the idea of adjusting the fuel injection quantity in accordance with the pressure that exists inside the accumulator section before the pilot injection is executed. The fuel injection quantity delivered by common rail fuel injection system is determined chiefly by the pressure inside the accumulator section at the time when the fuel is injected (i.e., the injection pressure) and the area of the nozzle opening of the fuel injector. If the pilot injection causes a pressure pulse to occur inside the accumulator section, the pressure fluctuation resulting from the pulse will overlap with the internal pressure of the accumulator section and cause the injection pressure at the time of the main injection to change. As a result, an error will exist between the actual total injection quantity and the total injection quantity that was set based on the pressure existing inside the accumulator section before the pilot injection was executed.

Meanwhile, the aforementioned patent publication describes the idea of calculating the pressure that exists inside the accumulator section after the fuel is injected by finding an average of instantaneous pressures, which increase and decrease cyclically due to the pressure pulsation. With this method, the use of the average value serves to cancel out the fluctuation caused by the pressure pulsation so that the calculated accumulator pressure corresponds to the static state that exists after the pressure pulsation has sufficiently attenuated. As a result, in cases where the main injection is executed at a point in time when the pressure fluctuation resulting from the pressure pulse caused by the pilot injection is large, then the calculated accumulator pressure (static pressure) will not match the actual injection pressure and the calculation of the fuel injection quantity will not be accurate.

The present invention was contrived in view of the foregoing and thus basically relates to engines that are provided with a common rail or otherwise provided with an accumulator section in the fuel supply passage and are configured to execute a plurality of fuel injections per cycle. One object of the present invention is to suppress the effect of pressure pulsation occurring inside the accumulator section due to the first fuel injection (e.g., a pilot injection) and thereby accurately control the fuel injection quantity.

In order to achieve the above identified object and other objects of the present invention, an engine fuel injection control device is provided that basically comprises an engine operating state detecting section and a fuel injection control section. The engine operating state detecting section is configured to detect an engine operating state of an engine. The fuel injection control section is configured to control a fuel injector connected to a pressure accumulator section. The fuel injection control section is configured such that at least two fuel injections per cycle are executed with a first fuel injection being executed prior to a second fuel injection with a fuel injection interval occurring between when the first fuel injection is executed and when the second fuel injection is executed. A first fuel injection quantity of fuel is injected during the first fuel injection set based on the engine operating state detected by the engine operating state detecting section. A second fuel injection quantity of fuel is injected during the second fuel injection set based on the engine operating state detected by the engine operating state detecting section. The second fuel injection quantity is varied in accordance with the fuel injection interval.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
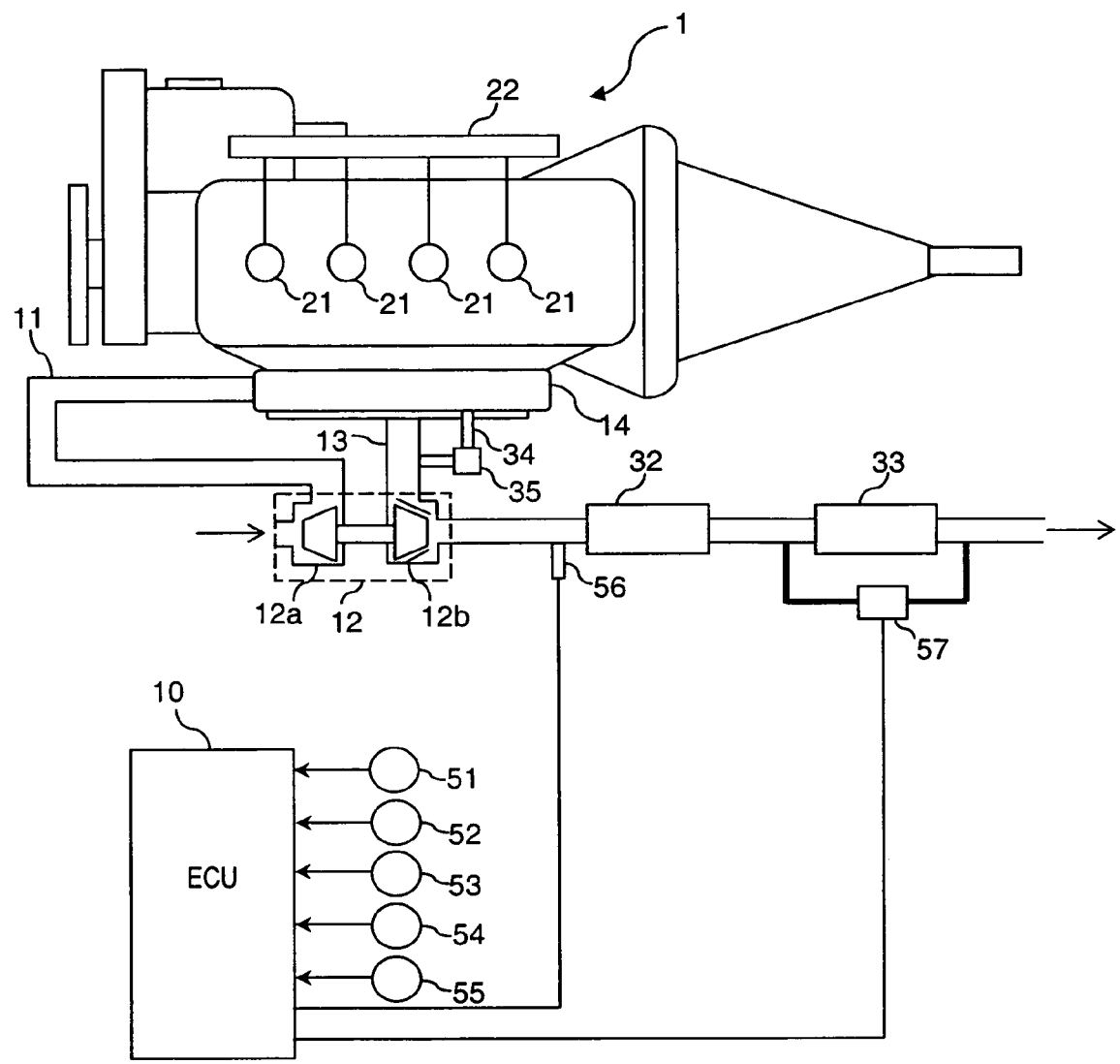
FIG. 1 is a schematic illustration of an engine equipped with an engine fuel injection control system in accordance with one embodiment of the present invention.

Referring initially to FIG. 1, a diesel automobile engine 1 is illustrated that is equipped with an engine fuel injection control system in accordance with a first embodiment of the present invention. In this embodiment, the engine 1 is a direct fuel injection engine. The engine fuel injection control system includes an electronic control unit (ECU) 10 that is configured and arranged to serve as an engine controller. The control unit 10 will be discussed in greater detail below.

The engine 1 is further equipped with an air cleaner (not shown) is mounted to an inlet portion of an air intake passage 11 to remove dust and particles from the intake air. A variable nozzle turbocharger 12 is operatively coupled to the diesel engine 1. The turbocharger 3 includes a compressor part 12a installed in the air intake passage 11 downstream of the air cleaner and a turbine part 12b installed in an exhaust passage 13 downstream of a manifold section. The compressor part 12a serves to compress the intake air delivered to the cylinders. In particular, the intake air that has passed through the air cleaner is compressed by the compressor part 12a and fed onward to a surge tank 14, where the intake air is distributed to the individual cylinders by a manifold section of the diesel engine 1. The turbine part 12b is driven by the exhaust gas and thereby turns the compressor 12a. The supercharging pressure of the turbocharger 12 is controlled by the electronic control unit 10 in accordance with the operating state of the engine by controlling the angle of the movable vanes of the provided on the turbine part 12b.

The engine 1 is also preferably equipped with a common rail fuel injection device having a plurality of fuel injection nozzles or injectors 21 and an accumulator or common rail 22. The injectors 21, one for each cylinder, are installed on the cylinder head of the engine main body. In this common rail fuel injection device, after fuel is pressurized by a high pressure fuel pump (not shown), the fuel is fed through a high-pressure fuel supply passageway such that the fuel accumulates in the common rail 22. The fuel is then distributed from this common rail 22 to the injectors 21. The injectors 21 are controlled by signals from the electronic control unit 10. Thus, the fuel is supplied to the injectors 21 from the common rail 22 and injected into the combustion chambers from the injectors 21. The pressure of the fuel inside the common rail 22 (hereinafter called the "rail pressure") is controlled to a prescribed pressure in accordance with the operating state of the engine 1.

The control unit 10 is configured to control the opening and closing of the nozzles of each of the injectors 21 to inject fuel into the engine cylinders. The fuel pressure inside the common rail 22 is variably adjusted by a pressure regulator (not shown) and a fuel pressure sensor is provided in the common rail 22 for detecting the fuel pressure. The fuel pressure sensor is configured and arranged to output a fuel pressure signal that is indicative of the rail pressure in the common rail 22 and that is received by the control unit 10.

In this embodiment, two fuel injections are executed per cycle: a pilot or first fuel injection and a main or second fuel injection. The pilot injection is a small-quantity injection executed during the compression stroke before the main injection and serves to suppress the generation of NOx. As explained below, the main injection is executed in accordance with the engine operating state of the engine 1, normally near top dead center, and serves to develop the output power of the engine. With the present invention, the time between the first and second fuel injections (i.e., the fuel injection interval) is taken into account when setting the second fuel injection quantity. Consequently, even if the pressure pulse caused by the first fuel injection acts to change the fuel injection pressure at the time of the second fuel injection, the second fuel injection can be controlled such that a quantity of fuel that compensates for the effect of the pressure pulse is injected and thus the fuel injection quantity can be controlled accurately.

The exhaust system of the engine 1 also includes a NOx trapping catalytic converter 32 that is configured to treat NOx in the exhaust passage 13 on the downstream side of the turbine part 12b. This NOx trapping catalytic converter 32 is configured and arranged to adsorb NOx when the exhaust air-fuel ratio of the exhaust flowing into the NOx trapping catalytic converter 32 is lean that is higher than the stoichiometric air-fuel ratio. Thus, the oxygen density of the exhaust flowing into the NOx trapping catalytic converter 32 drops. Conversely, when an oxygen concentration of the exhaust gas decreases such that the exhaust flowing into the NOx trapping catalytic converter 32 has a rich air-fuel ratio that is lower than the stoichiometric air-fuel ratio, then the NOx trapping catalytic converter 32 releases the adsorbed NOx and cleans the exhaust gas by catalytic action so as to perform a purification process. In other words, during the release of the trapped NOx, the NOx is cleaned by hydrocarbons and other deoxidizing components contained in the exhaust gas.

The exhaust system of the engine 1 also includes a diesel particulate filter 33 is provided downstream of the turbine part 12b and the NOx trapping catalytic converter 32 to after-treat the exhaust gas. The particulates in the exhaust gas are removed from the exhaust gas as the exhaust gas passes through the diesel particulate filter 33. Thus, the diesel particulate filter 33 is provided with a porous filter element that serves to filter the exhaust gas and remove particulates from the exhaust gas.

An EGR pipe 34 for recirculating exhaust gas (EGR) is connected between the exhaust passage 13 and the air intake passage 11 (i.e., the surge tank 14 in this embodiment). An EGR control valve 35 is installed in the EGR pipe 34 to control the flow rate of the recirculated exhaust gas. An appropriate amount of exhaust gas is recirculated to the air intake passage 2 in accordance with the opening degree of the EGR control valve 11, which operates in response to an EGR control signal from the electronic control unit 21. The EGR pipe 34 and EGR valve 35 constitute an EGR section or device.

The engine 1 is further provided with a plurality of sensors, including but not limited to, an accelerator sensor 51, a crank angle sensor 52, a rail pressure sensor 53, a vehicle speed sensor 54, a fuel temperature sensor 55, an air-fuel ratio sensor 56 and a pressure difference sensor 57. The accelerator sensor 51 is configured and arranged to detect the amount by which the driver is depressing the accelerator. The crank angle sensor 52 is configured and arranged to detect a unit crank angle and a reference crank angle. The rail pressure sensor 53 is configured and arranged to detect the rail pressure inside the common rail 22. The vehicle speed sensor 54 is configured and arranged to detect the speed of the vehicle. The fuel temperature sensor 55 is configured and arranged to detect the temperature of the fuel inside the fuel tank. The air-fuel ratio sensor 56 is configured and arranged to detect the air-fuel ratio of the exhaust. The pressure difference sensor 57 is configured and arranged to detect the pressure difference across the diesel particulate filter 33. The signals from these sensors 51-57 are fed to the electronic control unit 10. The electronic control unit 10 calculates the rotational speed of the engine based on the signal received from the crank angle sensor 52. The electronic control unit 10 sets the operation command values for the pilot injection and the main injection based on such engine operating conditions as the accelerator depression amount and the engine speed and sends the operation command values to the injectors 21.

The electronic control unit 10 preferably includes a microcomputer with a control program that controls the fuel injectors 21 as discussed below. The electronic control unit 10 can also include other conventional components such as an input interface circuit, an output interface circuit, and storage devices such as a ROM (Read Only Memory) device and a RAM (Random Access Memory) device. The microcomputer of the electronic control unit 10 is programmed to control the fuel injectors 21. The memory circuit stores processing results and control programs are run by the processor circuit. The electronic control unit 10 is operatively coupled to the sensors 51–57 in a conventional manner. The internal RAM of the electronic control unit 10 stores statuses of operational flags and various control data. The internal ROM of the electronic control unit 10 stores various operations as needed and/or desired. It will be apparent to those skilled in the art from this disclosure that the precise structure and algorithms for electronic control unit 10 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

In this embodiment, the operating states of the NOx trapping catalytic converter 32 and/or the diesel particulate filter 33 are determined and the mode of controlling the fuel injection is changed in accordance with the determined states. More particularly, when the amount of NOx trapped in the NOx trapping catalytic converter 32 reaches an upper limit, the excess air ratio is lowered and deoxidizing components are supplied to the NOx trapping catalytic converter 32 in order to regenerate the NOx trapping catalytic converter 32. Meanwhile, when the amount of particulates accumulated in the diesel particulate filter 33 reaches an upper limit, the fuel injection timing is retarded and the excess air ratio is increased to a value slightly higher than a value equivalent to the stoichiometric air-fuel ratio in order to regenerate the diesel particulate filter 33.

In this embodiment, the electronic control unit 10 functions as the fuel injection control device of the engine 1. The fuel injection control concept used in this embodiment will now be described. In this embodiment, each injector 21 executes two fuel injection operations per cycle: a pilot injection and a main injection. If the pilot injection causes a pressure pulse to occur inside the common rail 22, the pressure fluctuation resulting from the pulse will overlap with the rail pressure and cause the rail pressure, and thus the injection pressure, at the time of the main injection to change. As a result, an error will exist in the main fuel injection quantity.

The error of the main fuel injection quantity caused by the pressure pulse (hereinafter called "injection quantity error") can be expressed well in terms of the amount of time between when the pilot injection ends and when the main injection begins (hereinafter called the "fuel injection interval").

Figure 9A:
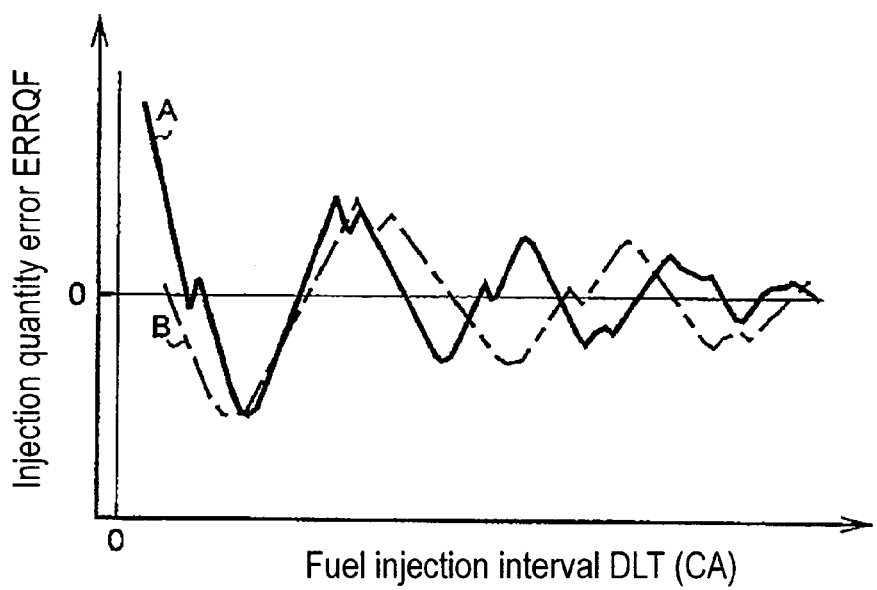
FIGS. 9(a) and 9(b) are plots of the fuel injection quantity error ERRQF versus the fuel injection interval that is used by the engine fuel injection control system in accordance with one embodiment of the present invention.
Figure 9B:
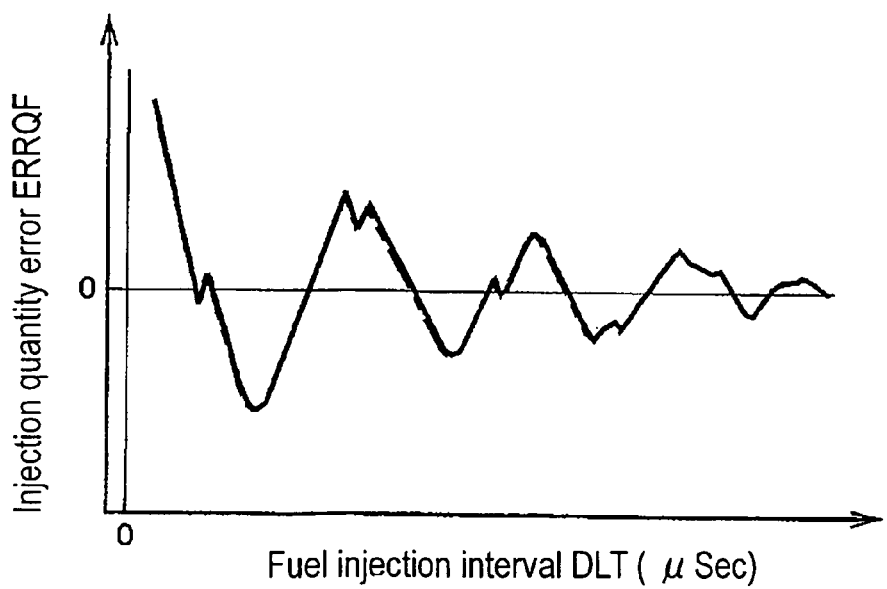

FIGS. 9(a) and 9(b) show plots of the injection quantity error ERRQF versus the fuel injection interval (in terms of the crank angle and time) for different engine speeds. The solid line A corresponds to a high engine speed and the single-dot chain line B corresponds to a low engine speed in FIG. 9(a). As shown in FIG. 9(b), when the injection quantity error ERRQF is plotted versus time, it can be evaluated with a single line irregardless of the engine speed.

Figure 10:
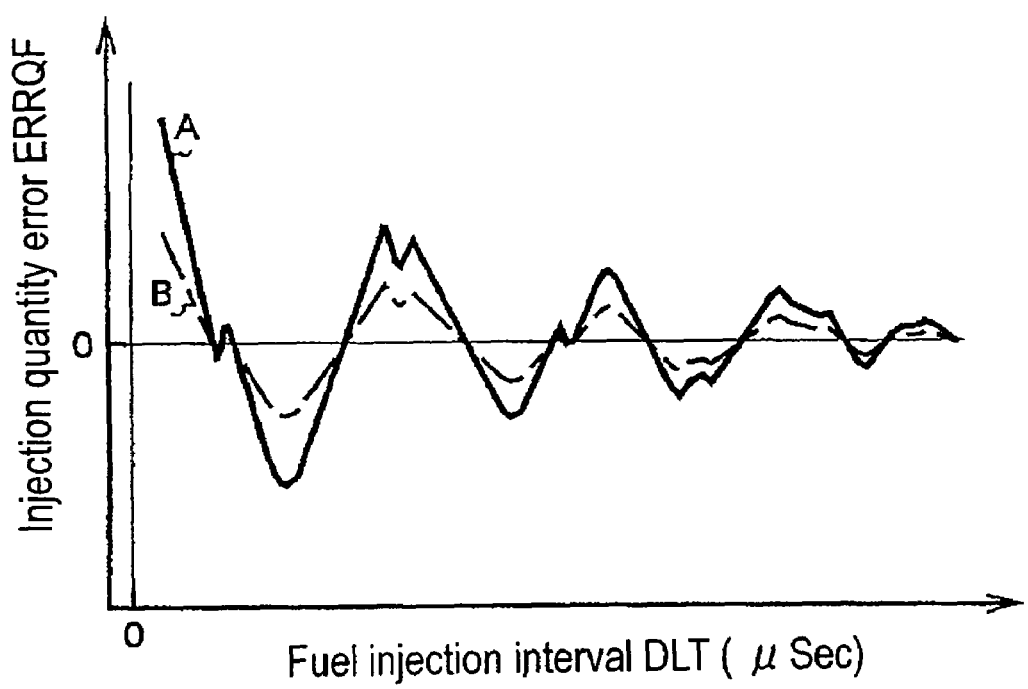
FIG. 10 is a plot of the injection quantity error versus the fuel injection interval for different pilot injection quantities.

The injection quantity error ERRQF also varies depending on the pilot injection quantity. FIG. 10 shows plots of the injection quantity error ERRQF versus the fuel injection interval for different pilot injection quantities with the engine speed fixed. The solid line A corresponds to a large pilot injection quantity and the single-dot chain line B corresponds to a small pilot injection quantity. Assuming the fuel injection interval is the same, the injection quantity error ERRQF is larger when the pilot injection quantity is larger.

Figure 11A:
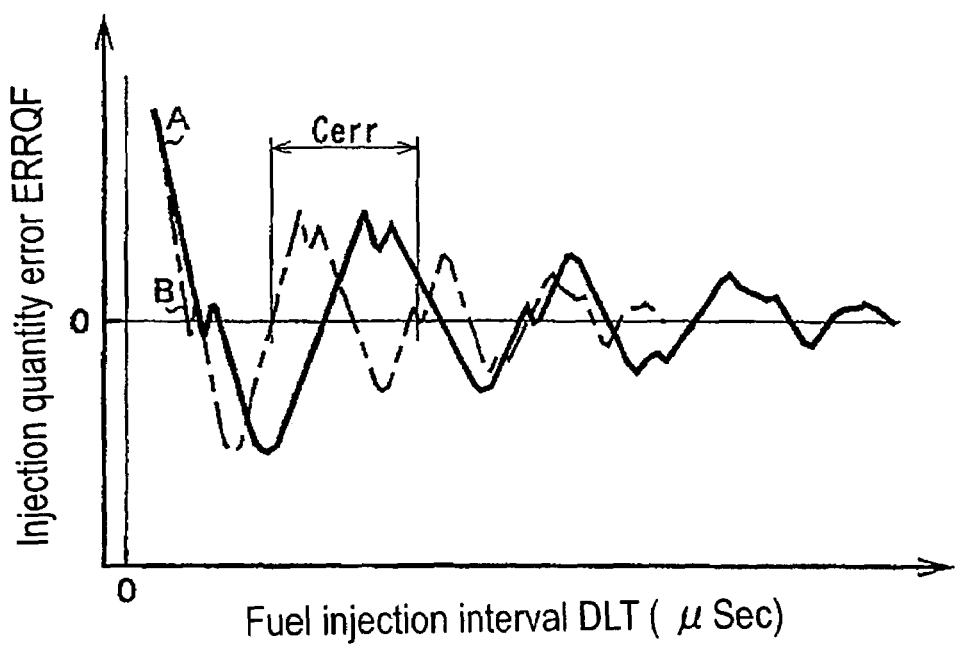
FIGS. 11(a) and 11(b) are plots of the injection quantity error versus the fuel injection interval for different rail pressures.
Figure 11B:
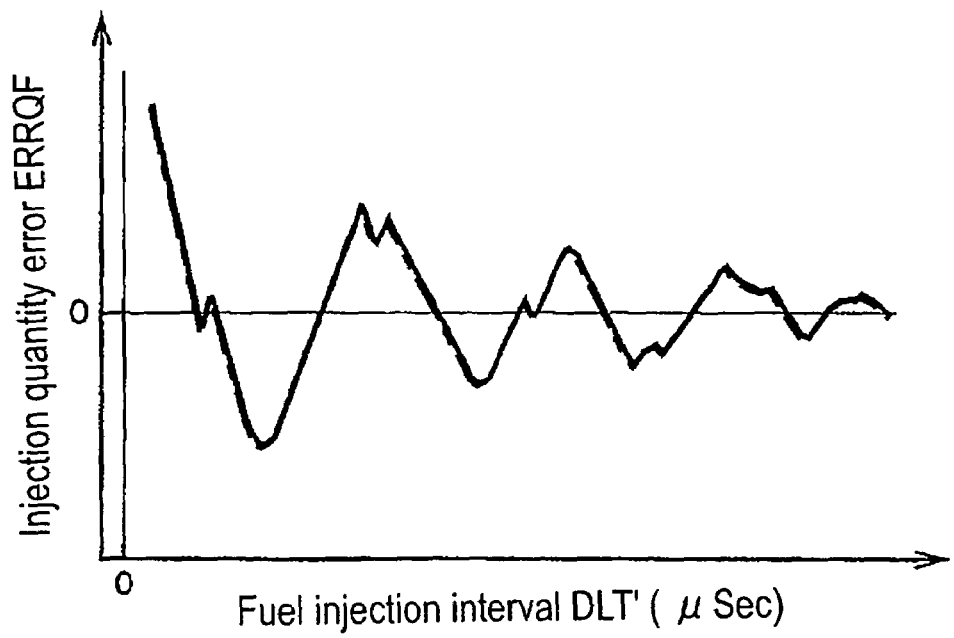

The injection quantity error also varies depending on the rail pressure and the fuel temperature. FIGS. 11(a) and 11(b) show plots of the injection quantity error ERRQF versus the fuel injection interval for different rail pressures with the engine speed fixed. The solid line A corresponds to a low rail pressure and the single-dot chain line B corresponds to a high rail pressure. FIG. 11(a) shows the actual injection quantity error ERRQF versus the fuel injection interval, while FIG. 11(b) shows the same plot with the fluctuation cycle time (period) Cerr of the injection quantity error ERRQF revised based on the rail pressure in order to enable the injection quantity error ERRQF to be evaluated with a single plot with respect to time. By compensating such that the higher the rail pressure is the more the fluctuation cycle time is lengthened, the injection quantity error ERRQF curves corresponding to the different rail pressures can be made to match. Although FIG. 11(b) enables the injection quantity error ERRQF to be evaluated with a single line with respect to time irregardless of the rail pressure, it is necessary to bear in mind that the actual injection quantity error ERRQF is smaller than the value obtained from the plot shown in FIG. 11(b). Also, increased fuel temperature has a similar effect on the fluctuation cycle time of the injection quantity error ERRQF as increased rail pressure. Thus, in order to evaluate with a single plot with respect to time, the fluctuation cycle time must be compensated such that the higher the fuel temperature is the more the fluctuation cycle time is lengthened.

Figure 2:
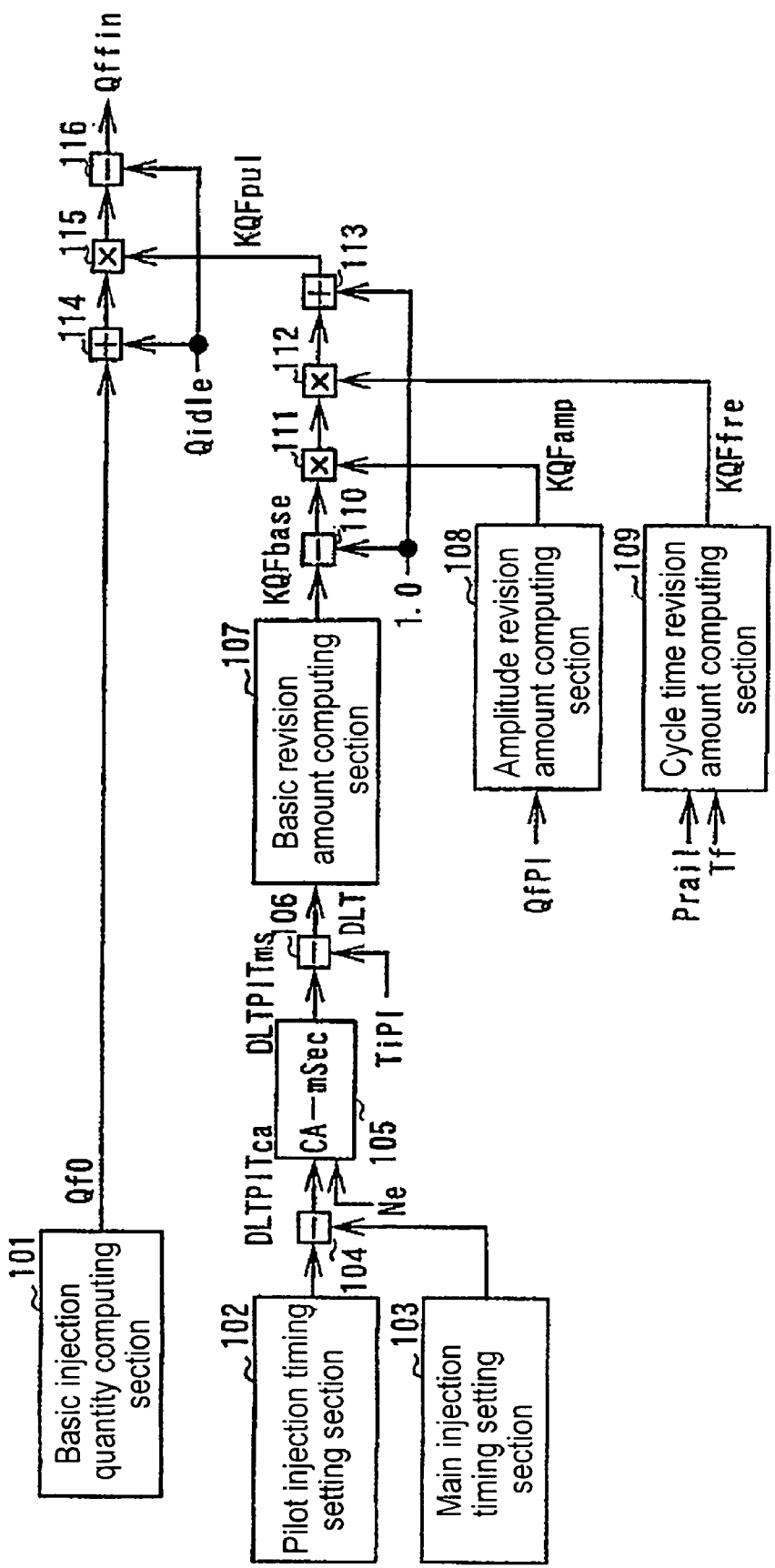
FIG. 2 is a functional block diagram illustrating a control processing executed by the fuel injection control unit of an ECU in accordance with the one embodiment of the present invention.

The constituent features and operation of the electronic control unit 10 will now be described. FIG. 2 shows the constituent features of the fuel injection control device of the electronic control unit 10. The basic injection quantity computing section 101 receives such engine operating conditions as the accelerator depression amount APO and the engine rotational speed Ne and also the detected states of the NOx trapping catalytic converter 32 and the diesel particulate filter 33. Based on this information, the basic injection quantity computing section 101 calculates a basic value or basic fuel injection amount for the fuel injection quantity, hereinafter called the "basic fuel injection quantity Qf0." In other words, in the basic injection quantity computing section 101, the basic the basic fuel injection quantity Qf0 is determined by searching a pre-stored map based on the engine operating conditions.

The pilot injection timing setting section 102 sets the start timing of the pilot injection, hereinafter called "pilot injection timing PIT," based on the engine operating conditions and the main injection timing setting section 103 sets the start timing of the main injection, hereinafter called "main injection timing MIT," based on the engine operating conditions. The injection timings PIT and MIT are set in units of crank angle by referring to a map stored in advance in the electronic control unit 10. Normally, the main injection timing MIT is set to occur at a crank angle near top dead center, while the pilot injection timing PIT is set to occur at a crank angle that precedes the main injection timing MIT by a prescribed amount (e.g., 30 degrees). The main injection timing MIT is set to a more advanced timing than the normal timing when the NOx trapping catalytic converter 32 is being regenerated and to a more retarded timing than the normal timing when the diesel particulate filter 33 is being regenerated. Similar to the main injection timing MIT, the pilot injection timing PIT is also changed from its normal timing during regeneration of the NOx trapping catalytic converter 32 or the diesel particulate filter 33.

Figure 4:
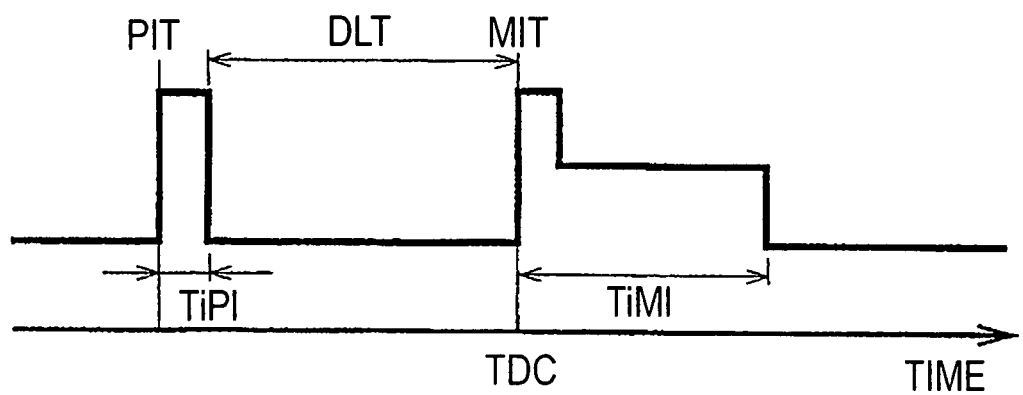
FIG. 4 is a plot of a drive pulse constituting an operation command value.

The subtraction section 104 calculates the difference DLTPITca between the pilot injection timing PIT and the main injection timing MIT. The unit converting section 105 reads the engine speed Ne and converts the unit of the calculated difference DLTPITca from an angular unit to a unit of time. The subtraction section 106 reads the injector energizing time TiPI for the pilot injection and then subtracts the energizing time TiPI from the converted difference DLTPITms to obtain the fuel injection interval DLT (FIG. 4).

$$DLT = DLTPITms - TiPI \tag{1}$$

The electronic control unit 10 then calculates the pilot injection quantity QfPI by searching a pre-stored map based on the engine operating conditions and sets the injector energizing time TiPI based on the pilot injection quantity QfPI and the rail pressure Prail.

The basic revision amount computing section 107 calculates a basic revision amount KQFbase based on the fuel injection interval DLT. The basic revision amount KQFbase is computed by searching the map shown in FIG. 5 using the fuel injection interval DLT. In this embodiment, the basic revision amount KQFbase takes into account the injection quantity error ERRQF shown in FIG. 9(b) and is a value that is either greater than or equal to 1 or less than 1 depending on the fuel injection interval DLT. Additionally, in this embodiment, the shorter fuel injection interval, the larger the amount by which the basic revision amount KQFbase (i.e., the absolute value |KQFbase−1|) deviates from 1.

Figure 6:
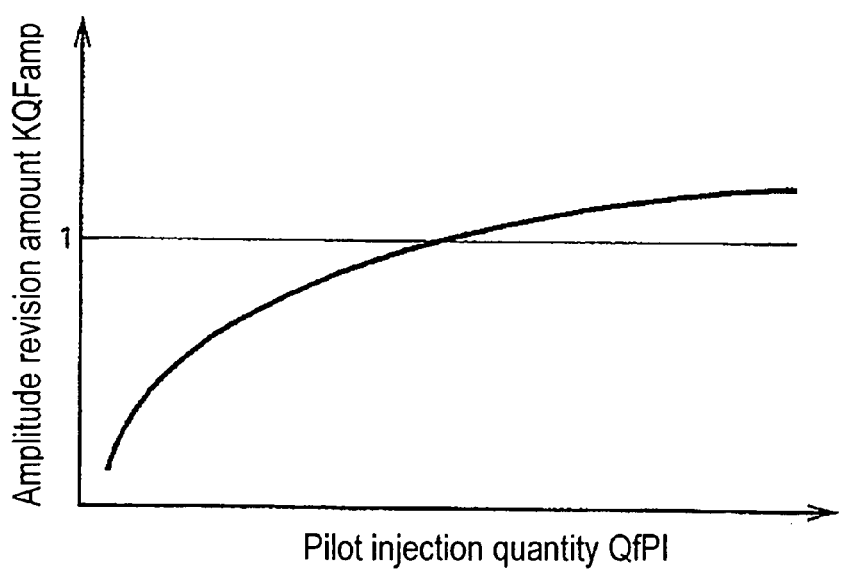
FIG. 6 is an amplitude revision amount KQFamp setting map used by the engine fuel injection control system in accordance with one embodiment of the present invention.

The amplitude revision amount computing section 108 reads the pilot injection quantity QfPI and calculates an amplitude revision amount KQFamp based on the pilot injection quantity QfPI. The amplitude revision amount KQFamp is computed by searching the map shown in FIG. 6 using the pilot injection quantity QfPI. The larger the pilot injection quantity QfPI is, the larger the value of the amplitude revision amount KQFamp is calculated to be. The cycle time revision amount computing section 109 reads the rail pressure Prail and the fuel temperature Tf and calculates a cycle time revision amount KQFfre based on the rail pressure Prail and fuel temperature Tf.

Figure 3:
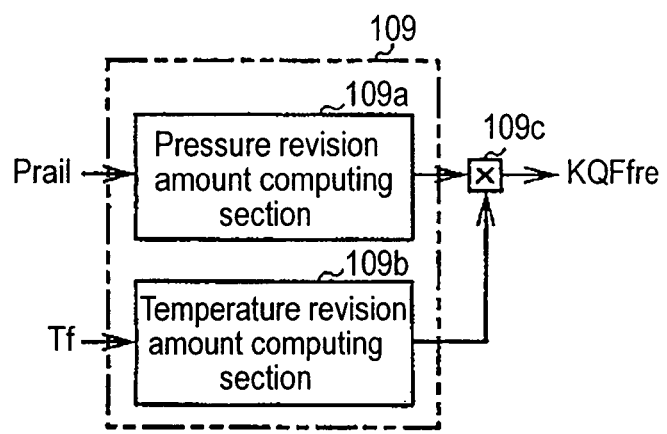
FIG. 3 is a functional block diagram of the cycle time revision amount computing unit for the engine fuel injection control system.
Figure 7:
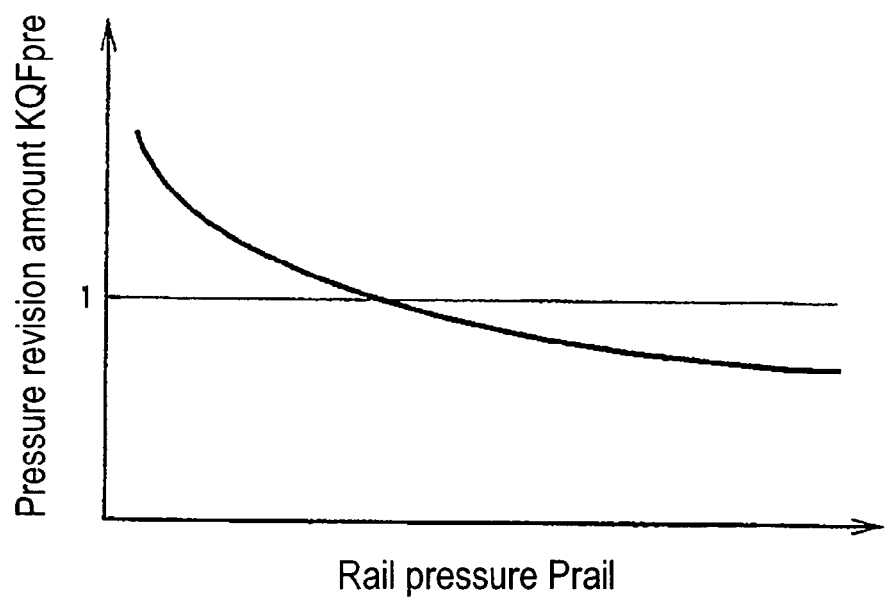
FIG. 7 is a pressure revision amount KQFpre setting map used by the engine fuel injection control system in accordance with one embodiment of the present invention.
Figure 8:
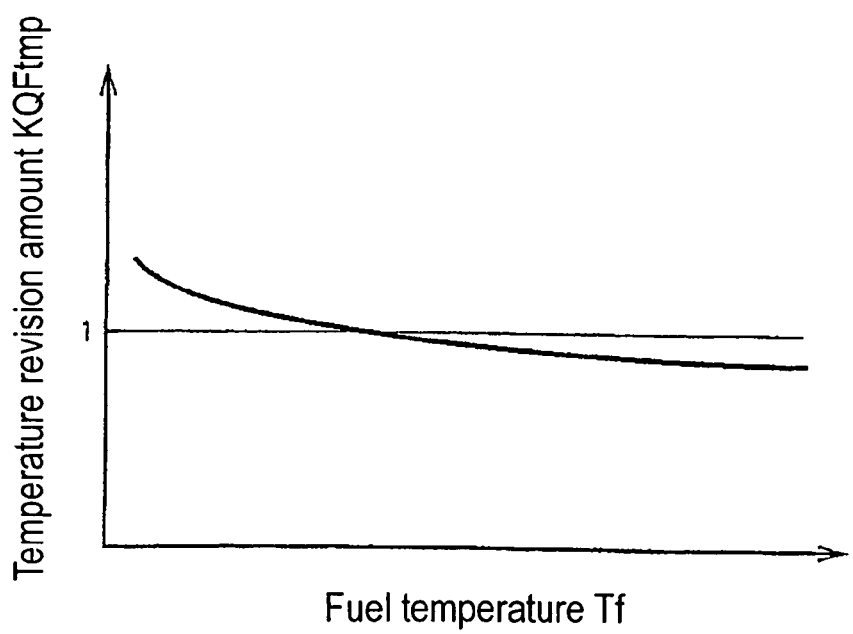
FIG. 8 is a temperature revision amount KQFtmp setting map used by the engine fuel injection control system in accordance with one embodiment of the present invention.

In this embodiment, the cycle time revision amount computing section 109 comprises a pressure revision amount computing unit 109a, a temperature revision amount computing section 109b, and a multiplication section 109c (FIG. 3). The pressure revision amount computing section 109a searches the table shown in FIG. 7 using the rail pressure Prail to calculate a pressure revision amount KQFpre. The temperature revision amount computing section 109b searches the map shown in FIG. 8 using the fuel temperature Tf to calculate a temperature revision amount KQFtmp. The pressure revision amount KQFpre is calculated such that the larger the rail pressure is the smaller the value of the pressure revision amount KQFpre is. The temperature revision amount KQFtmp is calculated such that the higher the fuel temperature is the smaller the value of the temperature revision amount KQFtmp is. The multiplication section 109c calculates the product of the of the pressure revision amount KQFpre and the temperature revision amount KQFtmp to calculate the cycle time revision amount KQFfre.

The subtraction section 110 subtracts a reference value of 1 from the basic revision amount KQFbase. The multiplication section 111 multiplies the reduced revision amount (i.e., KQFbase−1) by the amplitude revision amount KQFamp and the multiplication section 112 multiplies the product calculated by the multiplication section 111 by the cycle time revision amount KQFfre. The addition section 113 adds 1 to the revision amount obtained by the multiplication section 112 to calculate the pulse revision amount KQFpul. It is also acceptable to find the average of the pulse revision amounts obtained over a plurality of computing cycles and use the average value as the pulse revision amount KQFpul. In the following equations, the pulse revision amount obtained in the previous computing cycle is indicated as $KQFpul_z$.

$$KQFpul = (KQFbase - 1) \times KQFamp \times KQFfre + 1 \quad (2.1)$$

$$KQFpul = (KQFpul + KQFpul_z)/2 \quad (2.2)$$

The addition section 114 adds the idle injection quantity Qidle to the basic injection quantity Qf0. The multiplication section 115 multiplies the injection quantity obtained by the addition section 114 (i.e., Qf0+Qidle) by the pulse revision quantity KQFpul.

The subtraction section 116 subtracts the idle injection quantity Qidle from the injection quantity obtained from the multiplication section 115 to calculate the final injection quantity Qffin.

$$Qffin = (Qf0 + Qidle) \times KQFpul - Qidle \quad (3)$$

Thus, the electronic control unit 10 sets the pilot injection quantity QfPI and the main injection Quantity QfMI based on the final injection Quantity Qffin, sets the injector energizing times TiPI and TiMI for both injections based on the rail pressure Prail, and operates the fuel injector 21 based on the set injector energizing times.

In this embodiment, the common rail 22 forms the "pressure accumulator section" in the fuel supply passage. The accelerator sensor 51 and the crank angle sensor 52 constitute an engine operating state detecting section. The rail pressure sensor 53 constitutes the fuel pressure detecting section. The fuel temperature sensor 55 constitutes the fuel temperature detecting section. The fuel injection control unit (FIG. 2) of the electronic control unit 10 constitutes the fuel injection control section. More specifically regarding the fuel injection control unit, the subtraction sections 104 and 106 and the unit converting section 105 constitute the fuel injection interval detecting section. The basic injection quantity computing section 101, the basic revision amount computing section 107, the amplitude revision amount computing section 108, the cycle time revision amount computing section 109, and the multiplication section 111, 112 and 115 constitute the fuel injection quantity setting section.

The present invention offers the following effects. Firstly, when setting the final injection quantity Qffin (or the main injection quantity QfMI) as the fuel injection quantity, the amount of time between the end of the pilot injection and the start of the main injection (i.e., the fuel injection interval DLT) is taken into account in the form of the pulse revision amount KQFpul. Since the amount by which the main injection quantity QfMI is revised is larger when the fuel injection interval DLT is shorter, the error in the main injection quantity resulting from the pressure pulse caused by the pilot injection is suppressed and the total injection quantity of both injections can be controlled more accurately. In this embodiment, the NOx trapping catalytic converter 32 and the diesel particulate filter 33 are provided as exhaust gas cleaning devices and the fuel injection timings PIT and MIT are modified based on the operating states of these devices. Consequently, with this embodiment, the injection timings are varied in accordance with the individual operating conditions defining a given engine operating state and the effect of pressure pulses on each injection timing is suppressed. As a result, the fuel injection quantity can be controlled accurately and the operating performance of the engine can be improved. Additionally, the NOx trapping catalytic converter 32 and the diesel particulate filter 33 can be regenerated in a favorable manner.

Secondly, the fuel injection quantity can be controlled accurately irregardless of the pilot injection quantity because an amplitude revision amount KQFamp based on the pilot injection quantity QfPI is calculated and used to revise the pulse revision amount KQFpul. Thirdly, the fuel injection quantity can be controlled accurately irregardless of the engine operating state or the traveling environment because a cycle time revision amount KQFfre based on the rail pressure Prail and the fuel temperature Tf is calculated and used to revise the pulse revision amount KQFpul.

Although the preceding embodiment presents an example in which the amount of time from the end of the pilot injection to the start of the main injection is used as the fuel injection interval, it is also acceptable to use the amount of time from the start of the pilot injection (i.e., the pilot injection timing PIT) to the start of the main injection (i.e., the main injection timing MIT) as the fuel injection interval and revise the main injection quantity, i.e., total injection quantity, based on the fuel injection interval.

Figure 5:
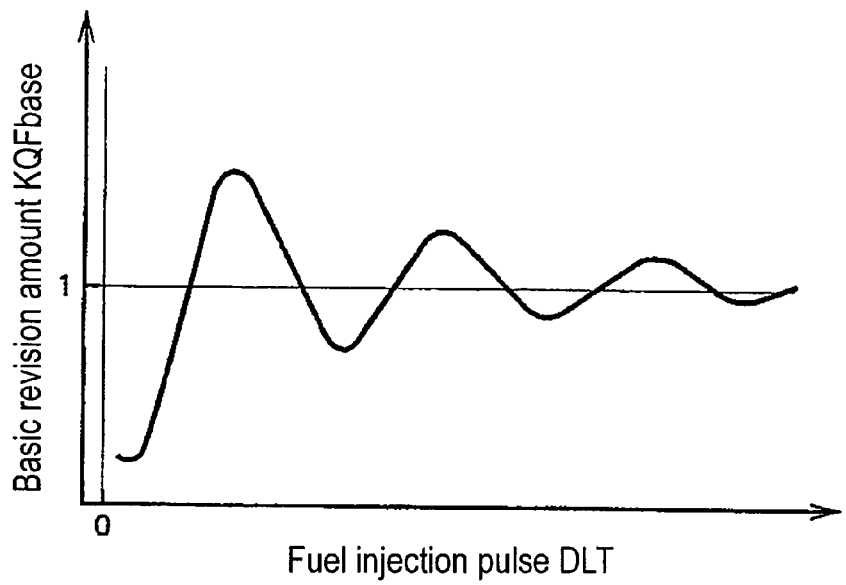
FIG. 5 is a basic revision amount KQFbase setting map used by the engine fuel injection control system in accordance with one embodiment of the present invention.

Additionally, although the preceding embodiment presents an example in which the cycle time revision amount KQFfre is used as a revision factor for the pulse revision amount KQFpul by being multiplied by the basic injection quantity KQFbase, it is also acceptable to multiply the fuel injection interval DLT by the cycle time revision amount KQFfre, thereby revising the fuel injection interval DLT, and use the revised fuel injection interval DLT to search a table for the basic revision amount KQFbase (FIG. 5). In such a case, the cycle time revision amount KQFfre is calculated such that its value is larger when the rail pressure Prail is higher or when the fuel temperature Tf is higher.

Furthermore, although the preceding embodiment presents an example in which the engine is a diesel engine employing a common rail, the present invention can be applied to a fuel injection control for a gasoline engine.

As used herein to describe the present invention, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An engine fuel injection control device comprising:
an engine operating state detecting section configured to detect an engine operating state of an engine; and
a fuel injection control section configured to control a fuel injector connected to a pressure accumulator section such that
at least two fuel injections per cycle are executed with a first fuel injection being executed prior to a second fuel injection with a fuel injection interval occurring between when the first fuel injection is executed and when the second fuel injection is executed,
a first fuel injection quantity of fuel being injected during the first fuel injection set based on the engine operating state detected by the engine operating state detecting section, and
a second fuel injection quantity of fuel being injected during the second fuel injection set based on the engine operating state detected by the engine operating state detecting section, the second fuel injection quantity being varied in accordance with the fuel injection interval,
the fuel injection control section including a fuel injection interval detecting section configured to detect the fuel injection interval, and a fuel injection quantity setting section configured to set the first and second fuel injection quantities with the second fuel injection quantity being first set to a basic fuel injection amount based on the engine operating state detected by the engine operating state detecting section and then the basic fuel injection amount being revised by a basic revision amount to a revised fuel injection amount in accordance with the fuel injection interval that has been detected,
the fuel injection quantity setting section being further configured to adjust the revised fuel injection amount of the second fuel injection quantity based on the first injection quantity such that the basic revision amount becomes a larger amount as the first fuel injection quantity becomes larger.

2. The engine fuel injection control device recited in claim 1, wherein
the fuel injection quantity setting section is further configured to revise the basic fuel injection amount of the second fuel injection quantity such that the basic revision amount becomes a larger amount as the fuel injection interval becomes shorter.

3. The engine fuel injection control device recited in claim 2, further comprising
a fuel pressure detecting section configured to detect fuel pressure of inside the pressure accumulator section; and
the fuel injection quantity setting section is further configured to adjust the revised fuel injection amount of the second fuel injection quantity based on the fuel pressure that has been detected.

4. The engine fuel injection control device recited in claim 3, wherein
the fuel injection quantity setting section is further configured to adjust the revised fuel injection amount of the second fuel injection quantity such that the basic revision amount becomes a smaller amount as the fuel pressure being detected becomes higher.

5. The engine fuel injection control device recited in claim 4, further comprising
a fuel temperature detecting section configured to detect a fuel temperature of the fuel to be injected; and
the fuel injection quantity setting section is further configured to adjust the revised fuel injection amount of the second fuel injection quantity based on the fuel temperature that has been detected.

6. The engine fuel injection control device recited in claim 5, wherein
the fuel injection quantity setting section is further configured to adjust the revised fuel injection amount of the second fuel injection quantity such that the basic revision amount becomes a smaller amount as the fuel temperature being detected becomes higher.

7. The engine fuel injection control device recited in claim 1, further comprising
a fuel pressure detecting section configured to detect fuel pressure of inside the pressure accumulator section; and
the fuel injection quantity setting section is further configured to adjust the revised fuel injection amount of the second fuel injection quantity based on the fuel pressure that has been detected.

8. The engine fuel injection control device recited in claim 7, wherein
the fuel injection quantity setting section is further configured to adjust the revised fuel injection amount of the second fuel injection quantity such that the basic revision amount becomes a smaller amount as the fuel pressure being detected becomes higher.

9. The engine fuel injection control device recited in claim 1, further comprising
a fuel temperature detecting section configured to detect a fuel temperature of the fuel to be injected; and
the fuel injection quantity setting section is further configured to adjust the revised fuel injection amount of the second fuel injection quantity based on the fuel temperature that has been detected.

10. The engine fuel injection control device recited in claim 9, wherein
the fuel injection quantity setting section is further configured to adjust the revised fuel injection amount of the second fuel injection quantity such that the basic revision amount becomes a smaller amount as the fuel temperature being detected becomes higher.

11. The engine fuel injection control device recited in claim 1, wherein
the fuel injection interval detecting section is further configured to detect the fuel injection interval by detecting an amount of time between a point in time when the first fuel injection ends and a point in time when the second fuel injection begins.

12. The fuel injection control device as recited in claim 1, wherein
the fuel injection control section is further configured to set the first and second fuel injections to more advanced timings than normal upon detecting a NOx trapping catalytic converter is being regenerated to release trapped NOx.

13. The fuel injection control device as recited in claim 1, wherein
the fuel injection control section is further configured to set the first and second fuel injections to more retarded timings than normal upon detecting a diesel particulate filter is being regenerated.

14. An engine fuel injection control device comprising:
engine operating state detecting means for detecting an engine operating state of an engine;
fuel injection control means for controlling a fuel injector connected to a pressure accumulator section such that
at least two fuel injections per cycle are executed with a first fuel injection being executed prior to a second fuel injection with a fuel injection interval occurring between when the first fuel injection is executed and when the second fuel injection is executed,
a first fuel injection quantity of fuel being injected during the first fuel injection set based on the engine operating state detected by the engine operating state detecting section, and
a second fuel injection quantity of fuel being injected during the second fuel injection set based on the engine operating state detected by the engine operating state detecting section, the second fuel injection quantity being varied in accordance with the fuel injection interval;
fuel injection interval detecting means for detecting the fuel injection interval; and
fuel injection ciuantity setting means for setting the first and second fuel injection quantities with the second fuel injection quantity being first set to a basic fuel injection amount based on the engine operating state detected by the engine operating state detecting section and then the basic fuel injection amount being revised by a basic revision amount to a revised fuel injection amount in accordance with the fuel injection interval that has been detected,
fuel injection quantity setting means further including a function for adjusting the revised fuel injection amount of the second fuel injection quantity based on the first injection quantity such that the basic revision amount becomes a larger amount as the first fuel injection quantity becomes larger.

15. A method of controlling fuel injection in an engine comprising:
detecting an engine operating state of the engine; and
controlling a fuel injector connected to a pressure accumulator section such that
at least two fuel injections per cycle are executed with a first fuel injection being executed prior to a second fuel injection with a fuel injection interval occurring between when the first fuel injection is executed and when the second fuel injection is executed,
a first fuel injection quantity of fuel being injected during the first fuel injection set based on the engine operating state detected by the engine operating state detecting section, and
a second fuel injection quantity of fuel being injected during the second fuel injection set based on the engine operating state detected by the engine operating state detecting section, the second fuel injection quantity being varied in accordance with the fuel injection interval;
detecting the fuel injection interval;
setting the first and second fuel injection quantities with the second fuel injection quantity being first set to a basic fuel injection amount based on the engine operating state detected by the engine operating state detecting section and then the basic fuel injection amount being revised by a basic revision amount to a revised fuel injection amount in accordance with the fuel injection interval that has been detected; and
adjusting the revised fuel injection amount of the second fuel injection quantity based on the first injection quantity such that the basic revision amount becomes a larger amount as the first fuel injection quantity becomes larger.

* * * * *